(12) United States Patent
Storage et al.

(10) Patent No.: US 9,765,694 B2
(45) Date of Patent: Sep. 19, 2017

(54) GAS TURBINE ENGINE HEAT EXCHANGERS AND METHODS OF ASSEMBLING THE SAME

(71) Applicant: UNISON INDUSTRIES, LLC, Jacksonville, FL (US)

(72) Inventors: Michael Ralph Storage, Beavercreek, OH (US); Dennis Alan McQueen, Miamisburg, OH (US); Roger Earl Foster, Beavercreek, OH (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 1223 days.

(21) Appl. No.: 13/900,101

(22) Filed: May 22, 2013

(65) Prior Publication Data

US 2014/0202158 A1    Jul. 24, 2014

Related U.S. Application Data

(60) Provisional application No. 61/680,484, filed on Aug. 7, 2012.

(51) Int. Cl.
*F02C 7/12*     (2006.01)
*F02C 7/14*     (2006.01)
*F28F 3/02*     (2006.01)

(52) U.S. Cl.
CPC .................. *F02C 7/12* (2013.01); *F02C 7/14* (2013.01); *F28F 3/02* (2013.01); *Y02T 50/675* (2013.01); *Y10T 29/49229* (2015.01)

(58) Field of Classification Search
CPC ...... F02C 7/06; F02C 7/12; F02C 7/16; F02C 7/18; F02C 7/185; F02C 7/14; F16N 2210/02; F01D 25/18; F01D 25/12; F02K 3/115; F28D 2021/0049; F28F 1/022; F28F 3/02

See application file for complete search history.

(56) References Cited

U.S. PATENT DOCUMENTS

| | | | | |
|---|---|---|---|---|
| 4,741,152 A | * | 5/1988 | Burr ........................ | F01D 25/18 60/39.08 |
| 4,782,658 A | * | 11/1988 | Perry ...................... | F02C 7/047 60/226.1 |
| 5,452,573 A | * | 9/1995 | Glickstein ................. | F02C 6/08 60/39.183 |
| 5,610,341 A | * | 3/1997 | Tortora ................... | F01D 17/02 73/756 |

(Continued)

*Primary Examiner* — Pascal M Bui Pho
*Assistant Examiner* — Stefan Ibroni
(74) *Attorney, Agent, or Firm* — GE Global Patent Operation; William S. Munnerlyn

(57) ABSTRACT

A heat exchanger assembly comprises a heat exchanger body including a first fluid circuit and a second fluid circuit. The first circuit includes a first bypass valve in flow communication with a first fluid circuit inlet channel. The first fluid circuit also includes a plurality of cooling channels in flow communication with the first bypass valve. The first bypass valve is configured to channel a first fluid to the plurality of cooling channels during a first mode of operation to facilitate reducing a temperature of the first fluid. The second fluid circuit includes a second bypass valve configured to facilitate a flow of a second fluid through at least a portion of the heat exchanger body during the first mode of operation.

18 Claims, 5 Drawing Sheets

(56) References Cited

U.S. PATENT DOCUMENTS

| | | | |
|---|---|---|---|
| 6,415,595 B1* | 7/2002 | Wilmot, Jr. | B64D 13/006 |
| | | | 60/266 |
| 7,426,834 B2* | 9/2008 | Granitz | F01D 25/18 |
| | | | 184/6.11 |
| 7,454,894 B2 | 11/2008 | Larkin et al. | |
| 7,836,680 B2* | 11/2010 | Schwarz | F01D 15/10 |
| | | | 60/225 |
| 7,946,806 B2 | 5/2011 | Murphy | |
| 8,261,527 B1* | 9/2012 | Stearns | F02C 7/06 |
| | | | 60/39.08 |
| 8,387,362 B2* | 3/2013 | Storage | F01D 25/125 |
| | | | 60/226.1 |
| 9,109,464 B2* | 8/2015 | Suciu | F01D 25/20 |
| 2005/0268612 A1* | 12/2005 | Rolt | B64D 33/08 |
| | | | 60/728 |
| 2008/0095611 A1 | 4/2008 | Storage et al. | |
| 2009/0313999 A1* | 12/2009 | Hunter | F01D 25/18 |
| | | | 60/772 |
| 2010/0043396 A1 | 2/2010 | Coffinberry | |
| 2012/0125594 A1 | 5/2012 | Elder | |
| 2013/0306265 A1* | 11/2013 | Appukuttan | F02C 7/14 |
| | | | 165/11.1 |
| 2014/0369812 A1* | 12/2014 | Caruel | F02K 3/06 |
| | | | 415/116 |
| 2015/0377132 A1* | 12/2015 | Caruel | F01D 25/12 |
| | | | 415/116 |

\* cited by examiner

GAS TURBINE ENGINE HEAT EXCHANGERS AND METHODS OF ASSEMBLING THE SAME

CROSS-REFERENCE TO RELATED APPLICATIONS

This application is a non-provisional application and claims priority to U.S. Provisional Patent Application Ser. No. 61/680,484 filed Aug. 7, 2012 for "METHODS AND ASSEMBLY FOR OPERATING GAS TURBINE HEAT EXCHANGERS", which is hereby incorporated by reference in its entirety.

BACKGROUND OF THE INVENTION

The application described herein relates generally to gas turbine engines, and more specifically to methods and apparatus for operating gas turbine engines.

Gas turbine engines typically include an inlet, a fan, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

During engine operation, significant heat is produced which raises the temperature of engine systems to unacceptable levels. Various lubrication systems are utilized to facilitate lubricating components within the gas turbine engine. The lubrication systems are configured to channel lubrication fluid to various bearing assemblies within the gas turbine engine and to at least one external generator. During operation, heat is transmitted to the lubrication fluid from heat generated by sliding and rolling friction by components like bearings and seals within the engine and generator. To facilitate reducing the operational temperature of the lubrication fluid, at least one known gas turbine engine utilizes separate heat exchangers, one for the engine lubricating fluid and one for the generator lubricating fluid, to cool the fluid circulating within.

Conventionally, both heat exchangers were mounted to the inside of the shroud which encases the fan assembly. However, as the heat loads of modern engines and generators increase, heat exchangers large enough to sufficiently cool the fluids no longer fit in space allotted in the shroud. Therefore, the heat exchangers are separated such that one may be located in the shroud while the other is mounted to the engine core.

Furthermore, when the engine is non-operational or is operating in circumstances where the engine is subject to subzero temperatures, cooling of the engine lubricating fluid is not required, and a bypass valve is engaged to prevent engine lubricating fluid from flowing through the heat exchanger. Because the hot engine fluid is not flowing through the exchanger, the exchanger decreases in temperature such that any engine fluid remaining within increases in viscosity and begins to congeal. When the bypass valve is disengaged to allow flow of engine lubricating fluid through the exchanger, the low temperature of the exchanger causes the flow of engine fluid to congeal before it can warm the exchanger to allow the engine fluid to flow.

Accordingly, there exists a need for a heat exchanger that combines multiple fluid systems and prevents the congealing of fluid when the engine is subjected to subzero temperatures.

BRIEF DESCRIPTION OF THE INVENTION

In one aspect, a heat exchanger assembly for use in a gas turbine engine including a core gas turbine engine having an axis of rotation and a fan casing substantially circumscribing the core gas turbine engine is provided. The heat exchanger assembly comprises a heat exchanger body including a first fluid circuit and a second fluid circuit. The first circuit includes a first bypass valve in flow communication with a first fluid circuit inlet channel. The first fluid circuit also includes a plurality of cooling channels in flow communication with the first bypass valve. The first bypass valve is configured to channel a first fluid to the plurality of cooling channels during a first mode of operation to facilitate reducing a temperature of the first fluid. The second fluid circuit includes a second bypass valve configured to facilitate a flow of a second fluid through at least a portion of the heat exchanger body during the first mode of operation.

In another aspect, a method of assembling a gas turbine engine including an axis of rotation is provided. The method comprises providing a fan casing that substantially circumscribes the gas turbine engine, providing a heat exchanger assembly, and coupling the heat exchanger assembly to the fan casing. The heat exchanger assembly includes a heat exchanger body including a first fluid circuit and a second fluid circuit. The first circuit includes a first bypass valve in flow communication with a first fluid circuit inlet channel. The first fluid circuit also includes a plurality of cooling channels in flow communication with the first bypass valve. The first bypass valve is configured to channel a first fluid to the plurality of cooling channels during a first mode of operation to facilitate reducing a temperature of the first fluid. The second fluid circuit includes a second bypass valve configured to facilitate a flow of a second fluid through at least a portion of the heat exchanger body during the first mode of operation.

In yet another aspect, a gas turbine engine assembly is provided. The gas turbine engine assembly comprises a core gas turbine engine having an axis of rotation, a fan casing substantially circumscribing the core gas turbine engine, and a heat exchanger assembly positioned within the fan casing. The heat exchanger assembly comprises a heat exchanger body including a first fluid circuit and a second fluid circuit. The first circuit includes a first bypass valve in flow communication with a first fluid circuit inlet channel. The first fluid circuit also includes a plurality of cooling channels in flow communication with the first bypass valve. The first bypass valve is configured to channel a first fluid to the plurality of cooling channels during a first mode of operation to facilitate reducing a temperature of the first fluid. The second fluid circuit includes a second bypass valve configured to facilitate a flow of a second fluid through at least a portion of the heat exchanger body during the first mode of operation.

DETAILED DESCRIPTION OF THE INVENTION

Figure 1:
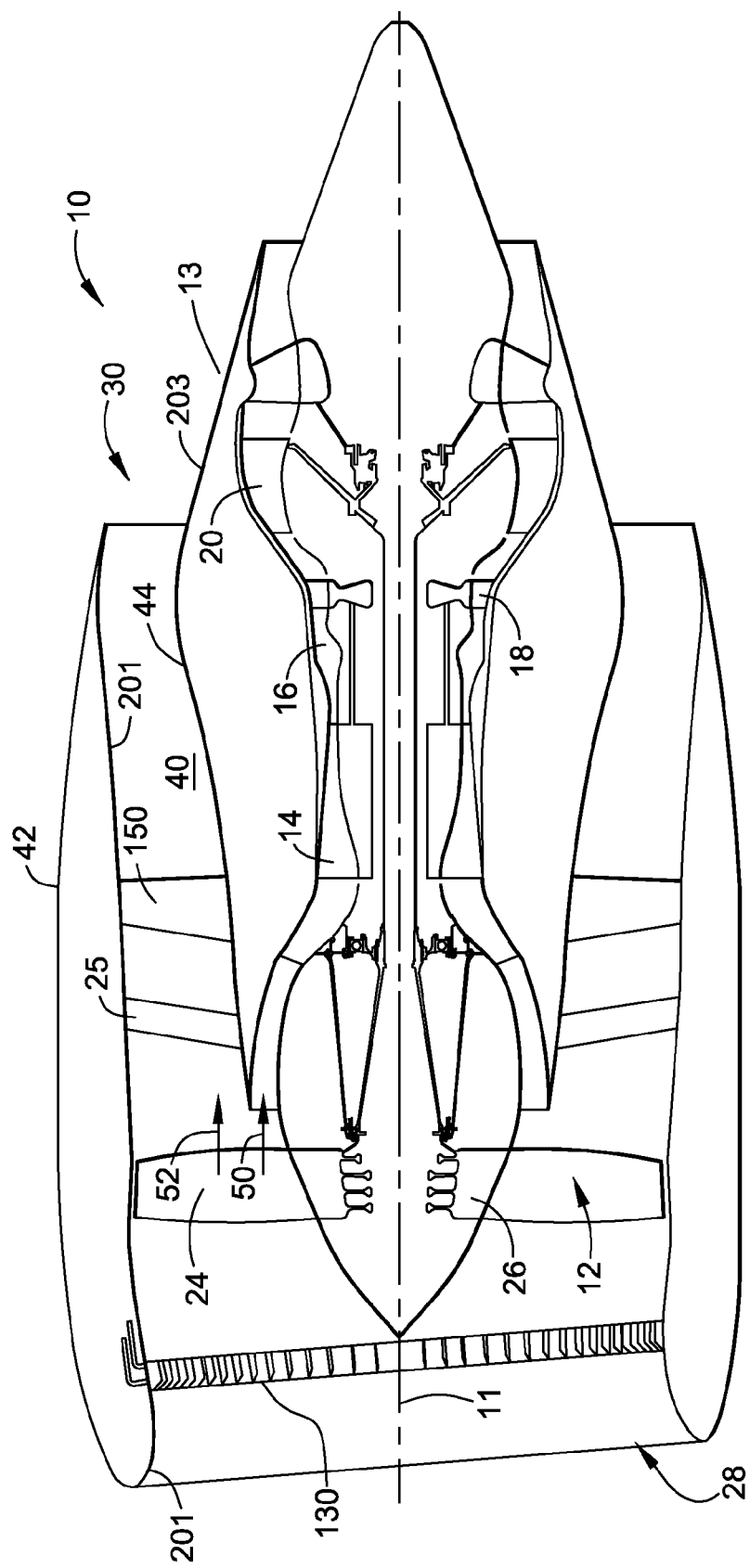
FIG. 1 is a schematic illustration of an exemplary gas turbine engine.

FIG. 1 is a schematic illustration of an exemplary gas turbine engine assembly 10 having a longitudinal axis 11. Gas turbine engine assembly 10 includes a fan assembly 12, and a core gas turbine engine 13. Core gas turbine engine includes a high pressure compressor 14, a combustor 16, and a high pressure turbine 18. In the exemplary embodiment, gas turbine engine assembly 10 may also include a low pressure turbine 20. Fan assembly 12 includes an array of fan blades 24 extending radially outward from a rotor disk 26. Engine 10 has an intake side 28 and an exhaust side 30. Gas turbine engine assembly 10 also includes a plurality of bearing assemblies (not shown in FIG. 1) that are utilized to provide rotational and axial support to fan assembly 12, compressor 14, high pressure turbine 18 and low pressure turbine 20, for example.

In operation, air flows through fan assembly 12 and is split by an airflow splitter 44 into a first portion 50 and a second portion 52. First portion 50 of the airflow is channeled through compressor 14 wherein the airflow is further compressed and delivered to combustor 16. Hot products of combustion (not shown in FIG. 1) from combustor 16 are utilized to drive turbines 18 and 20 and thus produce engine thrust. Gas turbine engine assembly 10 also includes a bypass duct 40 that is utilized to bypass a second portion 52 of the airflow discharged from fan assembly 12 around core gas turbine engine 13. More specifically, bypass duct 40 extends between an inner wall 201 of a fan casing or shroud 42 and an outer wall 203 of splitter 44.

Figure 2:
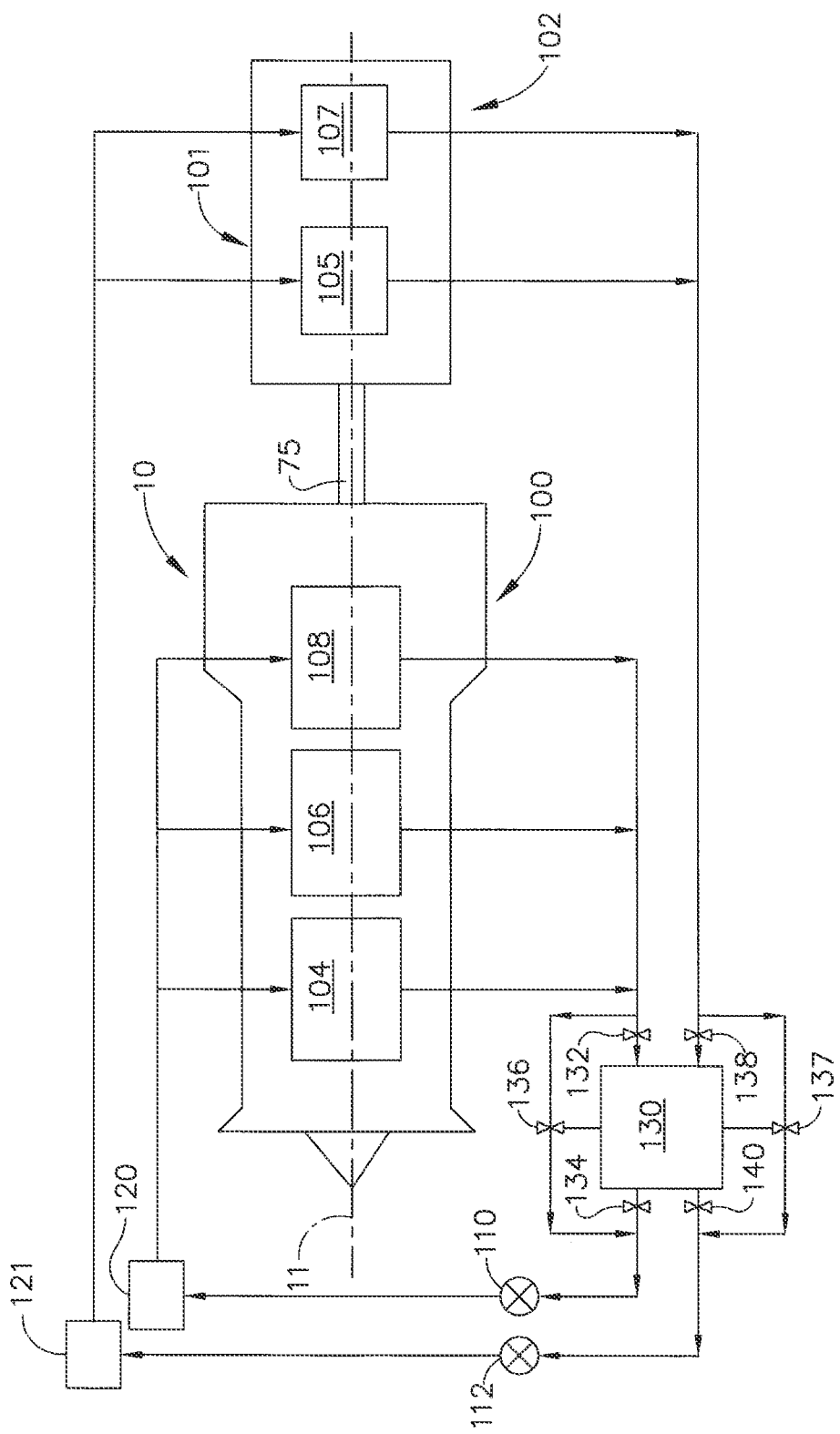
FIG. 2 is a schematic illustration of exemplary fluid systems that may be utilized with the gas turbine engine shown in FIG. 1.

FIG. 2 is a schematic illustration of an exemplary engine fluid system 100 that may be utilized with gas turbine engine 10 and an exemplary generator fluid system 102 that may be utilized with a generator 101 coupled to engine 10. In the exemplary embodiment, system 100 includes a first fluid supply source 120 and a first pump 110 which circulates engine lubrication fluid through a plurality of bearings 104, 106, 108 of engine 10 and where heat generated by bearings 104, 106, and 108 is transferred to the fluid. The engine lubricating fluid continues through engine fluid system 100 and returns to first fluid supply source 120 via a heat exchanger assembly 130. The temperature of the fluid is reduced as it flows through heat exchanger assembly 130. Alternatively, any fluid, such as condensing fluids or boiling refrigerants, may be channeled through heat exchanger assembly 130. In the exemplary embodiment, heat exchanger assembly 130 may include a first inlet port 132, and a first outlet port 134, and a first bypass valve 136 that may be either pressure controlled, thermally controlled, or electrically operated. Alternatively, first bypass valve may be controlled in any manner that facilitates heat exchanger assembly 130 operation as described herein. First bypass valve 136 is configured to direct the flow of lubricating fluid through heat exchanger assembly 130 according to either a first or second mode of operation.

Generator fluid system 102 includes a second fluid supply source 121 and a second pump 112 which circulates generator lubrication fluid through a plurality of bearings 105 and 107 of generator 101 and returns the hot fluid to second fluid supply source 121 via a heat exchanger assembly 130. Similarly, the temperature of the generator fluid is reduced as it flows through heat exchanger assembly 130. Alternatively, any fluid, such as condensing fluids or boiling refrigerants, may be channeled through heat exchanger assembly 130. One of turbines 18 or 20 are coupled to a shaft 75, which is further coupled to generator 101, such that the rotation of turbine 18 or 20 causes shaft 75 to rotate bearings 105 and 107 of generator 101 and produce electricity. Generator 101 distributes the electricity produced to other external systems of engine 10 for consumption. In the exemplary embodiment, heat exchanger assembly 130 may include a second inlet port 138, and a second outlet port 140, and a second bypass valve 137 that may be either pressure controlled or electrically operated.

In the exemplary embodiment, heat exchanger assembly 130 is an air cooled heat exchanger that is positioned within shroud 42. Heat exchanger assembly 130 may be utilized in a wide variety of applications on or off the engine. More specifically, heat exchanger 130 operates in a first mode of operation (shown in FIG. 5) when the engine lubricating fluid requires cooling and a second mode of operation (shown in FIG. 6) when the engine lubricating fluid does not require cooling.

Although heat exchanger assembly 130 is described herein to cool fluid for engine bearings 104, 106, and 108 and generator bearings 105 and 107, it may alternatively or simultaneously cool other fluids. For example, it may cool a fluid used to extract heat from actuators used on the engine. It may also be used to cool fluids which extract heat from electronic apparatus such as engine controls. In addition to cooling a wide variety of fluids utilized by a gas turbine engine assembly, it should be realized that heat exchanger assembly 130, and the methods described herein illustrate that heat exchanger assembly 130 may also cool an apparatus that is mounted on the airframe, and not part of the engine. In other applications, heat exchanger assembly 130 may be mounted remotely from the gas turbine engine, for example on an external surface of the aircraft. Moreover, when cooling of the engine fluid is not required, heat exchanger assembly 130 may be utilized to de-congeal engine lubricating fluid remaining in heat exchanger assembly 130 after first bypass valve 136 is engaged. Therefore, heat exchanger assembly 130 remains at a temperature warm enough such that engine fluid does not congeal when first bypass valve 136 is reengaged to direct the flow of engine fluid therethrough.

In the exemplary embodiment, shown in FIG. 1, heat exchanger assembly 130 is coupled to inner wall 201 of fan shroud 42 upstream from fan assembly 12, such that air channeled into intake side 28 is first channeled through heat exchanger assembly 130 prior to being supplied to fan assembly 12 to facilitate reducing the operating temperature of the engine and generator fluids channeled through heat exchanger assembly 130. Alternatively, heat exchanger assembly 130 may be coupled to inner wall 201, between an outlet guide vane 25 and a fan strut 150. Generally, heat exchanger assembly 130 may be positioned anywhere along the axial length of inner wall 201 of fan casing 42, or along radially outer surface 203 of splitter 44 within bypass duct 40. In the exemplary embodiment, efficiency is increased when heat exchanger assembly 130 is positioned adjacent engine intake side 28, where a diameter of fan assembly 12 is largest. The combination of systems 100 and 102 into a single heat exchanger assembly 130 reduces the cost and weight of engine 10 because a single heat exchanger assembly requires fewer parts as two separate assemblies. Furthermore, when heat exchanger assembly 130 is coupled to inner surface 201 of shroud 42, access is provided to core engine 13 because a separate generator heat exchanger, which is normally coupled to core 13 near splitter 44, is not required.

Figure 3:
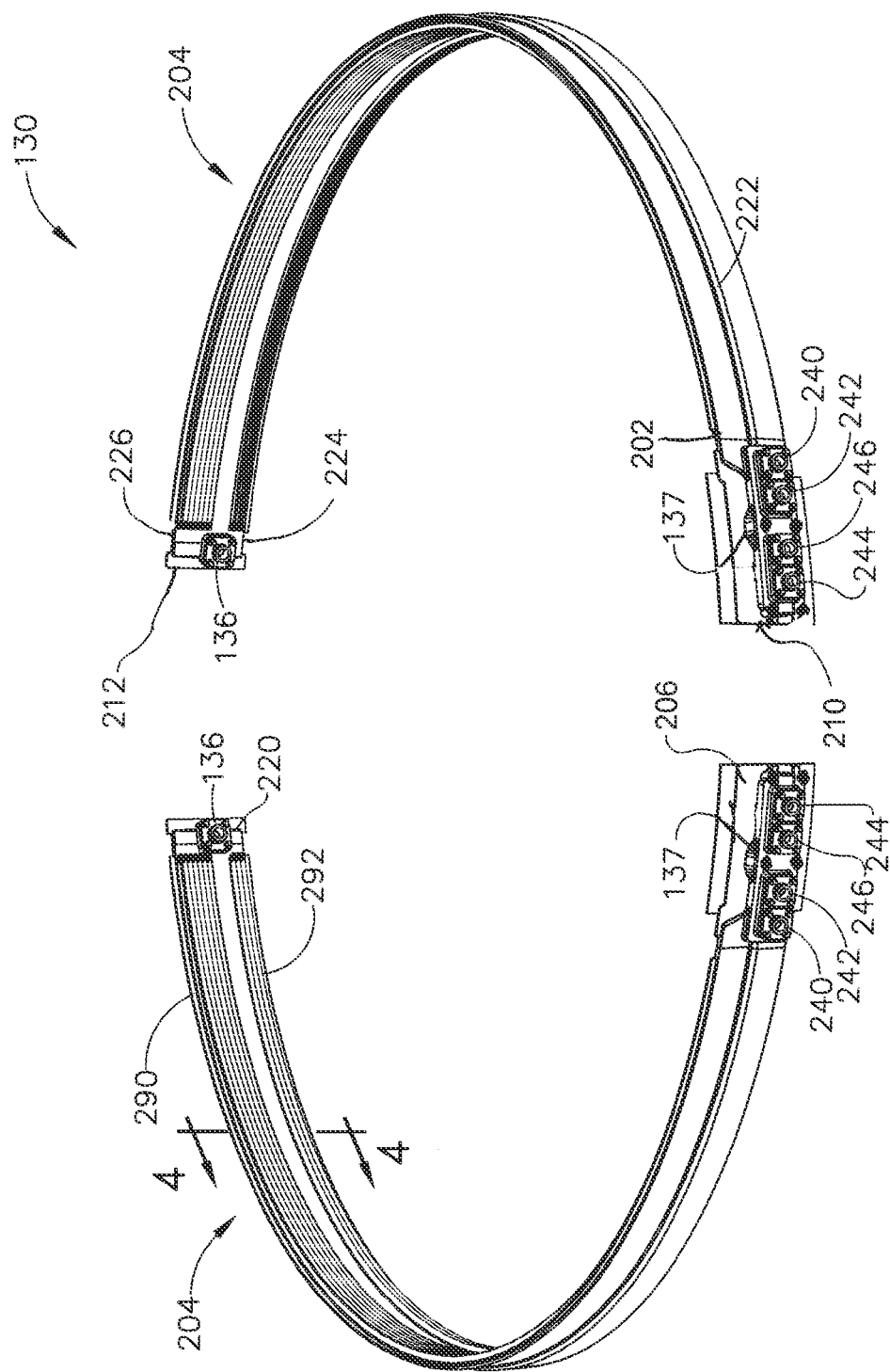
FIG. 3 is a perspective view of an exemplary arcuate heat exchanger assembly that may be utilized with the gas turbine engine shown in FIG. 1.
Figure 4:
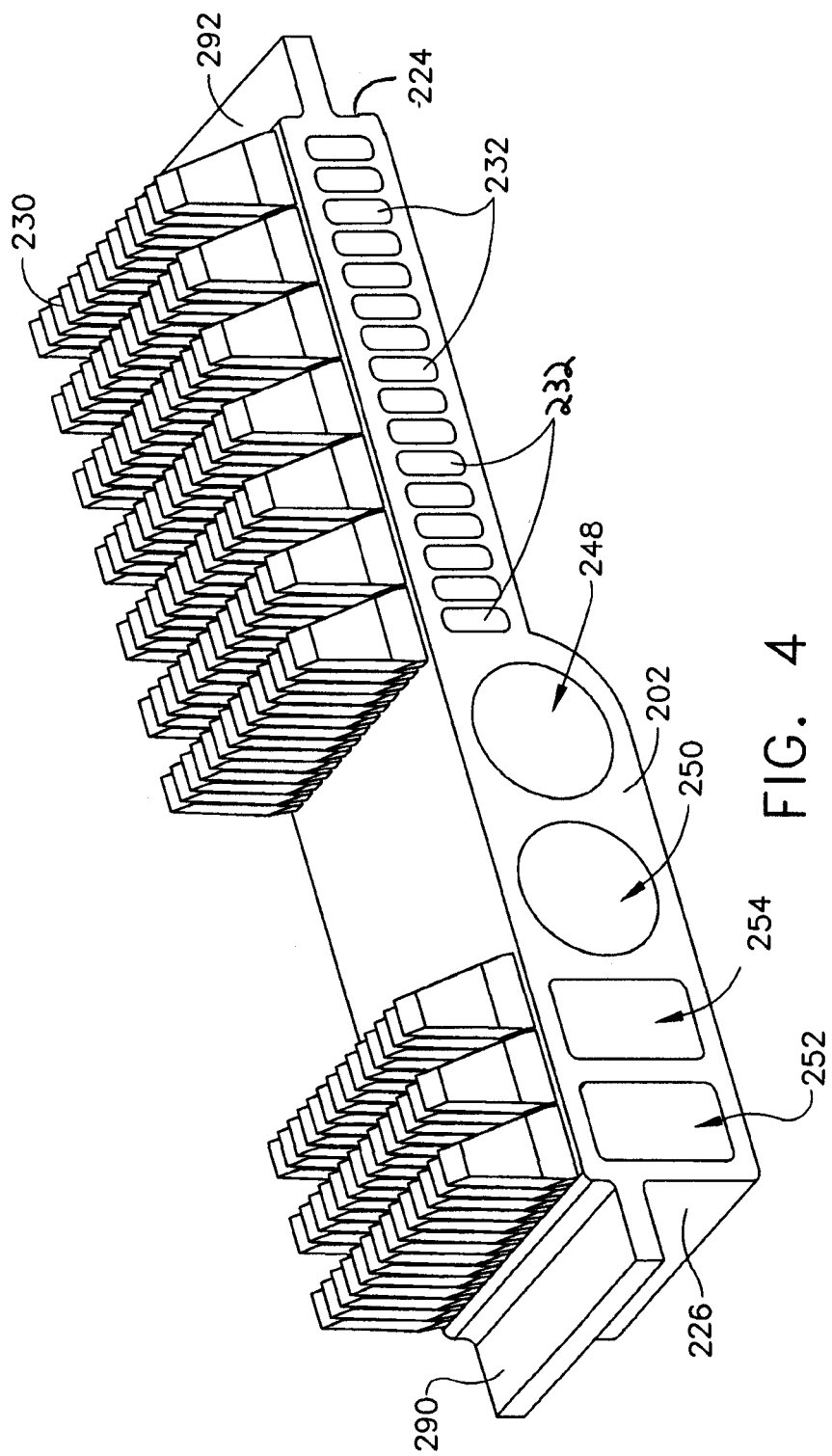
FIG. 4 is a perspective cross-sectional view of the heat exchanger assembly shown in FIG. 3 taken through line 4-4.

FIG. 3 is a perspective view of heat exchanger assembly 130 and FIG. 4 is a perspective cross-sectional view of heat exchanger assembly 130 taken through line 4-4 shown in FIG. 3. In the exemplary embodiment, during assembly, heat exchanger assembly 130 is formed such that heat exchanger assembly 130 has a circumferential and axial profile that is substantially similar to the circumferential and axial profile of at least a portion of shroud 42. More specifically, as shown in FIG. 1, heat exchanger assembly 130 is formed such that is has a circumferential and axial profile that is conforming to the circumferential and axial profile of the inner surface 201 of fan shroud 42 at the location where it is mounted. As such, heat exchanger assembly 130 has a substantially arcuate shape such heat exchanger assembly 130 may be placed proximate to an inner surface 201 of fan shroud 42 in alternate locations within engine 10. Moreover, heat exchanger assembly 130 may also be formed such that it has a circumferential and axial profile that is substantially similar to the circumferential and axial profile of outer surface 203 of splitter 44.

As shown in FIG. 3, heat exchanger assembly 130 is formed by a plurality of segments 204 mounted end-to-end covering substantially all (about) 320° of a circumference of one of shroud 42 or splitter 44. Alternatively, heat exchanger assembly 130 may be formed by a single segment 204, which covers the same circumferential length.

Referring again to FIGS. 3 and 4, each segment 204 of heat exchanger assembly 130 includes a heat exchanger body portion 202 having a first end 210 and an opposite second end 212. Body portion 202 also includes a radially inner surface 220, a radially outer surface 222, an upstream wall 226, and an opposite downstream wall 224. Body portion 202 may also include a plurality of cooling fins 230 extending radially inward from radially inner surface 220. Optionally, if heat exchanger assembly 130 is placed proximate to an outer surface of fan shroud 42, cooling fins 230 may extend either radially inward as shown in FIGS. 3 and 4, or may extend radially outward, or may include fins that extend both radially inward and radially outward from body portion 202. Moreover, if heat exchanger assembly 130 is placed proximate to outer surface 203 of splitter 44, the cooling fins 230 may extend either radially inward as shown in FIGS. 3 and 4, or may extend radially outward, or may include fins that extend both radially inward and radially outward from body portion 202.

Body portion 202 also includes a plurality of cooling channels 232 extending lengthwise through each arcuate heat exchanger assembly segment 204. Cooling channels 232 are selectively sized to receive engine fluid to be cooled therethrough. In the exemplary embodiment, body portion 202 includes sixteen cooling channels 232 extending therethrough. Optionally, body portion 202 may include a quantity greater than or less than sixteen channels 232 based on the cooling reduction desired. In the exemplary embodiment, channels 232 have a substantially rectangular cross-sectional profile. Alternatively, cooling channels 232 have a cross-sectional profile that is not rectangular such as for example, circular. Furthermore, channels 232 are parallel channels that may all carry the same fluid, or they may be segregated into multiple groups where each group carries a different cooling fluid used for different cooling purposes. For example, one group may carry lubrication fluid for the bearings, and another group might carry a separate cooling fluid for electronic apparatus on the engine.

In the exemplary embodiment, body portion 202 also includes a de-congealing inlet channel 248 and a de-congealing outlet channel 250. Channels 248 and 250 extend lengthwise through each arcuate segment 204 of heat exchanger assembly 130 and are selectively sized to receive engine fluid therethrough. In an alternative embodiment, body portion 202 may include more than one de-congealing inlet channel 248 and more than one de-congealing outlet channel 250. In the exemplary embodiment, channels 248 and 250 have a substantially circular cross-sectional profile. Alternatively, channels 248 and 250 may have a cross-sectional profile that is not circular such as for example, a rounded rectangular profile. In the exemplary embodiment, channels 232, 248, and 250 carry engine lubrication fluid between engine 10 and first fluid supply source 120 (shown in FIG. 2). Furthermore, channels 248 and 250 are parallel channels that may all carry the same fluid, or they may be segregated into multiple groups where each group carries a different cooling fluid used for different cooling purposes. For example, one group may carry lubrication fluid for the bearings, and another group might carry a separate cooling fluid for electronic apparatus on the engine. In the exemplary embodiment, heat exchanger assembly is formed such that cooling channels 232 are positioned adjacent de-congealing channels 248 and 250. Specifically, cooling channels 232 are positioned adjacent de-congealing inlet channel 248. Alternatively, cooling channels 232 may be positioned adjacent de-congealing outlet channel 250.

In the exemplary embodiment, body portion 202 further includes a generator fluid inlet channel 252 and a generator fluid outlet channel 254. Channels 252 and 254 extend lengthwise through each arcuate segment 204 of heat exchanger assembly 130 and are selectively sized to receive generator lubrication fluid therethrough. In an alternative embodiment, body portion 202 may include more than one generator fluid inlet channel 252 and more than one generator fluid outlet channel 254. In the exemplary embodiment, channels 252 and 254 have a substantially rectangular cross-sectional profile. Alternatively, channels 248 and 250 may have a cross-sectional profile that is not rectangular, such as, for example, circular. In the exemplary embodiment, channels 252 and 254 carry generator lubrication fluid between generator 101 and second fluid supply source 121 (shown in FIG. 2). Furthermore, channels 252 and 254 are parallel channels that may all carry the same fluid, or they may be segregated into multiple groups where each group carries a different cooling fluid used for different cooling purposes. For example, one group may carry lubrication fluid for the bearings, and another group might carry a separate cooling fluid for electronic apparatus on the engine. In the exemplary embodiment, generator fluid channels 252 and 254 are positioned adjacent de-congealing channels 248 and 250. Alternatively, generator fluid channels 252 and 254 may be positioned adjacent cooling channels 232 such that cooling channels 232 are located between generator fluid channels 252 and 254 and de-congealing channels 248 and 250.

In the exemplary embodiment, cooling fins 230 extend along a width of body portion 202 between upstream wall 226 and downstream wall 224 such that any number of rows of fins 230 are formed. Alternatively, fins 230 may be spaced along body portion 202 such that a gap is formed between at least two rows of fins 230, as shown in FIG. 4. Each row of fins 230 is made up of a plurality of individually formed fins 230 that facilitate reducing a temperature of both engine fluid and generator fluid. The plurality of fins 230 in each row facilitates a higher efficiency heat exchanger assembly because of the increased volume of cooling air flowing through fins 230. As installed in turbine engine 10, fins 230 extend axially along centerline axis 11 in parallel with the airflow direction and are arranged radially around an inside or outside surface of gas turbine engine 10. In the exemplary embodiment, cooling fins 230 are coupled to body portion 202 such that each of the cooling fins 230 is substantially perpendicular to openings 232 and such that the direction of the fluid channeled through channels 232 is approximately perpendicular to the direction of airflow channeled through cooling fins 230. More specifically, cooling fins 230 are aligned substantially parallel with centerline axis 11 such that the airflow channeled into or around fan intake 28 is first channeled between adjacent cooling fins 230.

In one embodiment, body portion 202 is formed utilizing an extrusion process such that cooling fins 230 are integrally formed with body portion 202. A fin machining process, for example, is then conducted to form the cooling fins 230. Optionally, cooling fins 230 may be coupled to body portion 202 utilizing a welding or brazing procedure, for example. In the exemplary embodiment, body portion 202 and cooling fins 230 are fabricated from a metallic material, such as aluminum.

To facilitate channeling a fluid through body portion 202, heat exchanger assembly 130 also includes at least one engine fluid inlet connection 240, at least one engine fluid outlet connection 242, at least one generator fluid inlet connection 244, at least one generator fluid outlet connection 246, first bypass valve 136, and second bypass valve 137. Connections 240 and 242 are coupled in flow communication with first bypass valve 136 and connections 244 and 246 are coupled in flow communication with one another and with second bypass valve 137. In the exemplary embodiment, connections 240, 242, 244, 246, and bypass valve 137 are each coupled to either first end 210 or second end 212 of segment 204 via a manifold 206 and bypass valve 136 is coupled to segment 204 at opposing end 210 or 212. Alternatively, bypass valve 136 may be coupled to the same end, either end 210 or 212, as connections 240, 242, 244, 246, and bypass valve 137. Bypass valves 136 and 137 may not be coupled to segment 204 at all, but separated from while remaining in flow communication with segment 204.

In the exemplary embodiment, engine fluid inlet connection 240 may be coupled to port 132 (shown in FIG. 2) and engine fluid outlet connection 242 may be coupled to port 134 (shown in FIG. 2) such that ports 132 and 134 may be operated to channel engine lubrication fluid from system 100 through heat exchanger assembly 130 during desired operating conditions. First bypass valve 136 is configured to channel engine lubrication fluid through cooling channels 232 during a first mode of operation, or through de-congealing outlet channel 250 during a second mode of operation, described in further detail below. Similarly, generator fluid inlet connection 244 may be coupled to port 138 (shown in FIG. 2) and generator fluid outlet connection 246 may be coupled to port 140 (shown in FIG. 2) such that ports 138 and 140 may be operated to channel generator lubrication fluid from system 102 through heat exchanger assembly 130 during certain operating conditions. Second bypass valve 137 is configured to channel generator lubrication fluid through channels 252 and 254 during the first mode of operation, or only through connections 244 and 246 during the second mode of operation when channels 252 and 254 are bypassed.

Heat exchanger assembly 130 is configured to include a plurality of fluid circuits, each with an inlet connection and an outlet connection. These circuits each have a separate and distinct purpose and carry non-mixing fluids, which are used for cooling different apparatus. Specifically, inlet 240, outlet 242, channels 232, 248, and 250, and bypass valve 136 are configured to carry engine lubrication fluid from system 100; and inlet 244, outlet 246, channels 252 and 254, and bypass valve 137 are configured to carry generator lubrication fluid from system 102.

To facilitate securing heat exchanger assembly 130 to gas turbine engine assembly 10, body portion 202 includes a first tab 290 that is coupled to upstream wall 226 and a second tab 292 that is coupled to downstream wall 224. In the exemplary embodiment, tabs 290 and 292 are each fabricated from the same metallic material as body portion 202 and formed unitarily with body portion 202 utilizing an extrusion process. Alternatively, tabs 290 and 292 are formed as separate components that are attached to body portion 202 utilizing a welding or brazing procedure, for example.

In the exemplary embodiment, heat exchanger assembly 130 is positioned within gas turbine engine assembly 10 such that the inner wall 201 of fan shroud 42 includes recesses (not shown) to receive heat exchanger assembly 130. Heat exchanger assembly 130 is coupled to shroud 42 such that the inner surface of inner wall 201 is flush with radially inner surface 220 of body portion 202 at the base of fins 230 to facilitate reducing or eliminating pressure losses caused by heat exchanger assembly 130 being present in the air stream. More specifically, heat exchanger assembly 130 is coupled within gas turbine engine assembly 10 such that only the cooling fins 230 extend radially inward from surface 201. As such, the inner wall 201 of fan shroud 42 is utilized to substantially cover body portion 202 such that cooling airflow is channeled only through cooling fins 230.

Heat exchanger assembly 130 is formed to include a profile that substantially conforms to a profile of fan casing inner surface 201 or splitter outer surface 203. Heat exchanger assembly 130 is then coupled to gas turbine engine assembly 10 such that the inner surface of inner wall 201 is flush with radially inner surface 220 of body portion 202 at the base of the fins 230 as discussed above.

Figure 5:
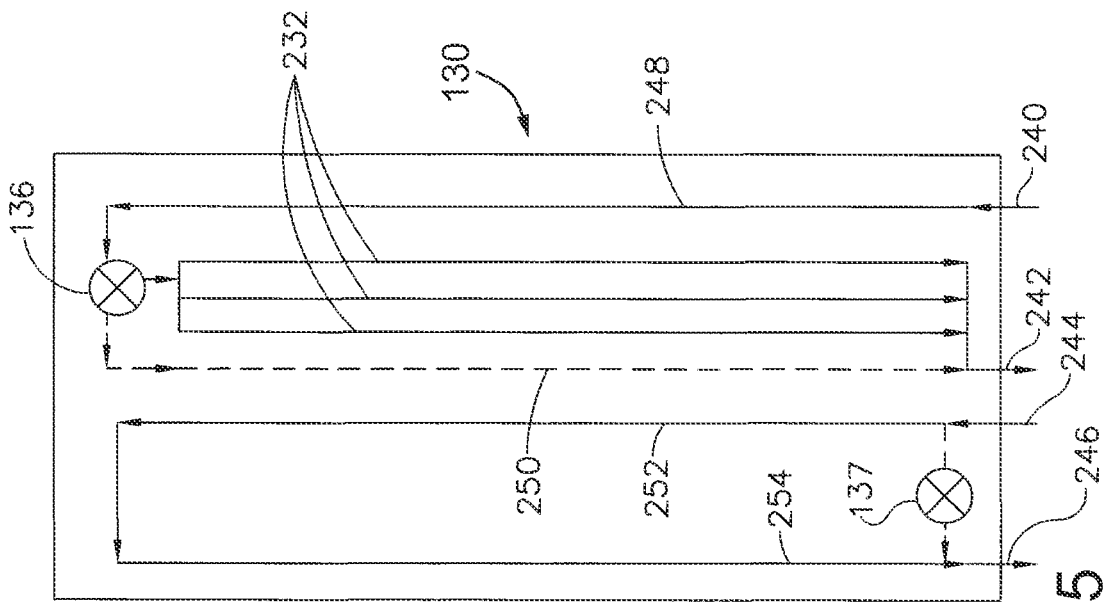
FIG. 5 is a schematic illustration of a first mode of operation through the heat exchanger shown in FIG. 3.

FIG. 5 is a schematic illustration of a first mode of operation, shown by solid lines, through heat exchanger assembly 130 shown in FIG. 3. The first mode of operation is the standard operating mode of heat exchanger assembly 130 where hot lubrication fluid absorbs heat from various engine 10 and generator 101 components and requires cooling through heat exchanger assembly 130. During the first mode of operation, hot lubrication fluid is channeled from the gas turbine engine 10 into each segment 204 of heat exchanger assembly 130 through inlet connection 240. The hot engine fluid then flows the length of segment 204 through de-congealing inlet channel 248 and is directed by first bypass valve 136 to flow back through segment 204 via cooling channels 232 and out of heat exchanger assembly 130 through outlet connection 242.

During the first mode of operation, the hot engine lubrication fluid is cooled as it flows through cooling channels 232 by the airflow through fins 230 such that the engine fluid is discharged at a substantially cooler temperature to first fluid supply source 120 (shown in FIG. 2). Specifically, the engine lubrication fluid is channeled in a substantially circumferential orientation within or around gas turbine engine 10. Simultaneously, cooling airflow supplied into or around fan intake 28 is channeled through cooling fins 230 to facilitate reducing an operational temperature of the engine lubrication fluid channeled through heat exchanger assembly 130. Specifically, during the first mode of operation, the hot engine lubrication fluid is channeled through openings 232 wherein the fluid transfers its heat to a conductive surface, i.e. body portion 202 of heat exchanger assembly 130 and thus cooling fins 230. The relatively cooler air supplied via inlet 28 is channeled across and/or through cooling fins 230 wherein the heat is transferred from cooling fins 230 to the airflow channeled through duct 40.

Furthermore, during the first mode of operation, hot generator lubrication fluid is channeled from generator 101 into each segment 204 of heat exchanger assembly 130 through inlet connection 244. The hot generator fluid then flows the length of segment 204 through generator fluid inlet channel 252 and back through segment 204 via generator fluid outlet channel 254 and out of heat exchanger assembly 130 through outlet connection 246. Bypass valve 137 is disengaged in the first mode of operation so as to allow generator fluid to flow the length of each segment 204. The hot generator lubrication fluid is cooled as it flows through channels 252 and 254 by the airflow through fins 230 such that the generator fluid is discharged at a substantially cooler temperature to second fluid supply source 121 (shown in FIG. 2). Specifically, the relatively hot generator lubrication fluid is channeled through channels 252 and 254 wherein the hot fluid transfers its heat to a conductive surface, i.e. body portion 202 of heat exchanger assembly 130, and thus cooling fins 230. The relatively cooler air supplied via inlet 28 is channeled across and/or through cooling fins 230 wherein the heat is transferred from cooling fins 230 to the airflow channeled through duct 40.

Figure 6:
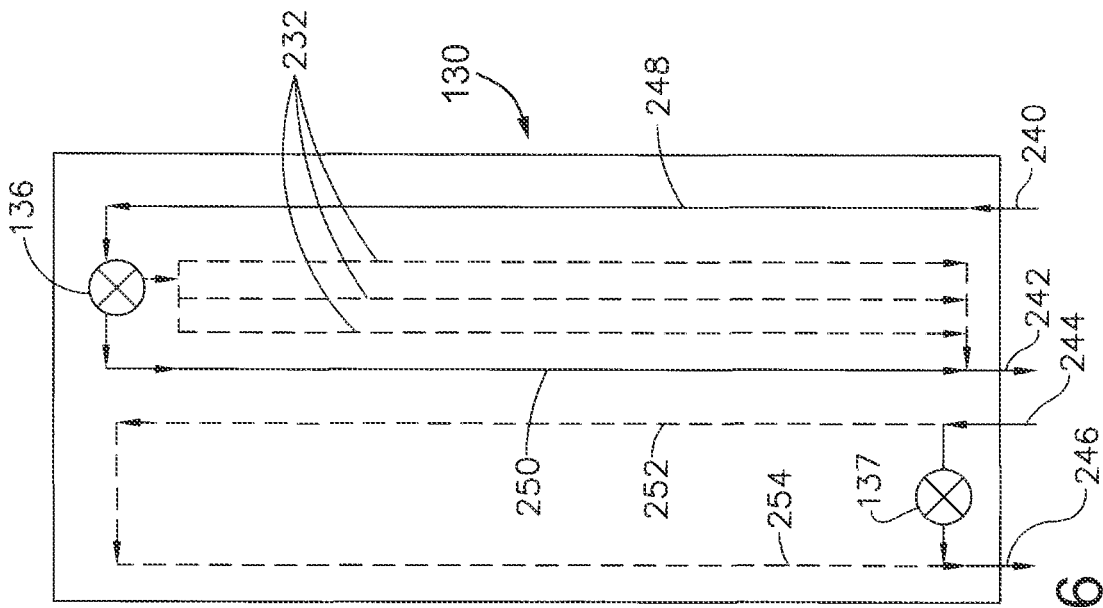
FIG. 6 is a schematic illustration of a second mode of operation through the heat exchanger shown in FIG. 3.

FIG. 6 is a schematic illustration of a second mode of operation (shown by solid lines) through heat exchanger assembly 130. The second mode of operation is a de-congealing mode that is utilized when engine 10 is subjected to low enough temperatures such that the engine lubrication fluid reaches a pre-determined temperature measured at an inlet of heat exchanger body 202. At such pre-determined temperature the engine lubrication fluid is too viscous to flow easily through cooling channels 232. When the engine lubrication fluid reaches a pre-determined temperature of approximately 100 degrees Fahrenheit, it is not hot enough to require cooling through cooling channels 232, as in the first mode of operation (shown by dotted lines in FIG. 6), and the fluid remaining in cooling channels 232 may begin to congeal. Heat exchanger assembly 130 must be kept warm enough to facilitate de-congealing of fluid present in each segment 204 of heat exchanger assembly 130 when the fluid is not hot enough to require cooling. During the second mode of operation, the engine lubrication fluid does not require cooling, but still retains some heat from its use in engine 10.

During the second mode of operation, engine lubrication fluid is channeled from the gas turbine engine 10 into each segment 204 of heat exchanger assembly 130 through inlet connection 240. The engine fluid then flows the length of segment 204 through de-congealing inlet channel 248, where first bypass valve 136 directs the flow to bypass cooling channels 232 and flow back through segment 204 via de-congealing outlet channel 250 instead of through cooling channels 232, as in the first mode of operation. The engine fluid is then discharged from heat exchanger assembly 130 through outlet connection 242 to reservoir 120.

Alternatively, in order to allow the engine fluid to flow through the largest cross-sectional area possible and reduce the pressure drop in heat exchanger assembly 130, the second mode of operation may include directing the flow of engine lubricating fluid back through segment 204 via de-congealing channel 250 and cooling channels 232.

During the second mode of operation, de-congealing mode, the engine fluid flowing the entire length of each segment 204 of heat exchanger assembly 130 through de-congealing channels 248 and 250 transfers heat to body portion 202 of each segment 204 such that heat exchanger assembly 130 is heated by conduction to retain heat exchanger assembly 130 at a sufficient temperature to facilitate de-congealing of engine fluid within cooling channels 232 of heat exchanger assembly 130. The heating of body portion 202 allows any engine fluid in cooling channels 232 to de-congeal such that the engine fluid flows easily through channels 232. When the engine fluid in a single channel 232 de-congeals, the heat conducted is sufficient enough such that remaining channels 232 de-congeal quickly thereafter. Moreover, the close proximity of de-congealing inlet channel 248 containing warm engine lubricating fluid to cooling channels 232 provides further heat by conduction, thus decreasing the amount of time required to heat segment 204 to facilitate de-congealing. Therefore, it is beneficial to locate channel 248 near channels 232 such that only one wall of body portion 202 separates each channel 232 from de-congealing inlet channel 248.

If heat exchanger assembly 130 was not heated by channels 248 and 250 during the second mode of operation, then the flow of engine fluid through cooling channels 232 during the first mode of operation may be obstructed by congealed engine fluid present in the cold heat exchanger assembly. Furthermore, the time required to warm the heat exchanger assembly to facilitate de-congealing of the engine fluid may be extended because of the lower initial temperature than the temperature of heat exchanger assembly 130 having constant flow of warming engine fluid during the second mode of operation.

Furthermore, during the second mode of operation, bypass valve 137 is engaged to prevent generator lubrication fluid from flowing through channels 252 and 254. Generator fluid is channeled from generator 101 into each segment 204 of heat exchanger assembly 130 through inlet connection 244 in the same manner as in the first mode of operation. The fluid then flows through bypass valve 137 and out of heat exchanger assembly 130 through outlet connection 246. During the second mode of operation, the generator fluid does not require cooling as in the first mode of operation, so flow through each segment 204 of heat exchanger assembly 130 is bypassed. The conductive heat of the engine fluid flowing through channels 248 and 250 during the second mode of operation facilitates warming the heat exchanger assembly 130 such that any generator fluid remaining in channels 252 and 254 de-congeals. Specifically, during the second mode of operation, engine fluid flowing through de-congealing inlet 248 facilitates de-congealing of cooling channels 232 and engine fluid flowing through de-congealing outlet channel 250 facilitates de-congealing generator channels 252 and 254.

The above-described heat exchanger assembly 130 combines the channeling of lubrication fluid from engine fluid system 100 with the channeling of generator lubrication fluid from generator fluid system 102 into a single heat exchanger assembly 130. Because fins 230 are more efficient, heat exchanger assembly 130 requires less space on the shroud, thus allowing for systems 100 and 102 to be combined into one heat exchanger assembly 130. The combination of systems 100 and 102 into a single heat exchanger assembly 130 reduces the cost and weight of engine 10 because a single heat exchanger assembly requires fewer parts as two separate assemblies. Furthermore, because heat exchanger assembly 130 is coupled to inner surface 201 of shroud 42 and not to engine core 13 or splitter 44, access is provided to core engine 13 because a separate generator heat exchanger, which is normally coupled to core 13 or splitter 44, is not required.

Exemplary embodiments of heat exchanger assemblies are described above in detail. The heat exchanger assemblies are not limited to the specific embodiments described herein, but rather, components of each system may be utilized independently and separately from other components described herein. For example, each heat exchanger assembly may be utilized in a wide variety of gas turbine engines and positioned within a wide variety of locations within the gas turbine engine. Moreover, the heat exchanger assemblies described herein may also be coupled to an external surface of the fan shroud if desired. Where practical, they can be mounted anywhere there is an airflow which can provide cooling.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heat exchanger assembly for use in a gas turbine engine including a core gas turbine engine having an axis of rotation and a fan casing substantially circumscribing the core gas turbine engine and a fan duct, said heat exchanger assembly comprising:
    a heat exchanger body, wherein the entire heat exchanger body is extending circumferentially with a substantially arcuate shape on a surface of the fan casing or on a surface of a splitter of the core gas turbine engine, such that the heat exchanger body has a circumferential and axial profile that substantially conforms to a circumferential and axial profile of the fan duct at a location within the fan duct where the heat exchanger body is mounted;
    a first bypass valve included in the heat exchanger body;
    a first fluid circuit inlet channel, included in the heat exchanger body, in flow communication with said first bypass valve;
    a first set of cooling channels, included in the heat exchanger body, in flow communication with said first bypass valve, wherein said first bypass valve is configured to channel a first fluid to said first set of cooling channels during a first mode of operation to facilitate reducing a temperature of said first fluid; a second bypass valve, included in the heat exchanger body;
    a second fluid circuit inlet channel, included in the heat exchanger body, in flow communication with said second bypass valve;
    a second set of cooling channels, included in the heat exchanger body, in flow communication with said second bypass valve, wherein said second bypass valve is configured to facilitate a flow of a second fluid through at least a portion of said heat exchanger body during the first mode of operation;
    wherein the first set of cooling channels and the second set of cooling channels extend across a majority of an entire circumferential length of the body; and
    wherein the first fluid and the second fluid do not mix.

2. The heat exchanger assembly in accordance with claim 1, wherein said first first set of cooling channels includes a first fluid circuit outlet channel in flow communication with said first bypass valve, wherein said first bypass valve is configured to channel said first fluid to said first fluid circuit outlet channel during a second mode of operation.

3. The heat exchanger assembly in accordance with claim 2, wherein said first bypass valve is configured to channel the first fluid to said first fluid circuit outlet channel when the first fluid reaches a first pre-determined temperature at an inlet of said heat exchanger body.

4. The heat exchanger assembly in accordance with claim 1, wherein said second bypass valve is configured to prevent a flow of said second fluid through at least a portion of said heat exchanger body during a second mode of operation.

5. The heat exchanger assembly in accordance with claim 1, wherein said first fluid circuit inlet channel is in fluid communication with a gas turbine engine lubrication fluid system and said second fluid circuit inlet channel is in fluid communication with a generator lubrication fluid system.

6. The heat exchanger assembly in accordance with claim 1, wherein said heat exchanger assembly is coupled within a recess located in a radially interior surface of the fan casing.

7. The heat exchanger assembly in accordance with claim 1 further comprising a plurality of cooling fins extending radially from at least one exterior surface of said heat exchanger body, said plurality of cooling fins configured to receive a flow of air to facilitate reducing a temperature of the first and second fluids flowing through said heat exchanger body during the first mode of operation.

8. The heat exchanger assembly in accordance with claim 1, wherein said first and second bypass valves are positioned at opposing ends of said heat exchanger body.

9. The heat exchanger assembly in accordance with claim 2, wherein said first fluid circuit inlet channel is adjacent to said first set of cooling channels such that the flow of the first fluid through said first fluid circuit inlet channel during the second mode of operation facilitates de-congealing an amount of the first fluid within said first set of cooling channels.

10. A method for assembling a gas turbine engine including an axis of rotation, the method comprising:
    providing a fan casing that substantially circumscribes the gas turbine engine;
    providing a heat exchanger assembly, comprising a heat exchanger body, wherein the entire heat exchanger body is extending circumferentially with a substantially arcuate shape on a surface of the fan casing or on a surface of a splitter of the core gas turbine engine;
    a first bypass valve included in the heat exchanger body;
    a first fluid circuit inlet, included in the heat exchanger body, channel in flow communication with said first bypass valve;

a first set of cooling channels, included in the heat exchanger body, in flow communication with said first bypass valve, wherein said first bypass valve is configured to channel a first fluid to said first set of cooling channels during a first mode of operation to facilitate reducing a temperature of said first fluid;

a second bypass valve, included in the heat exchanger body;

a second fluid circuit inlet channel, included in the heat exchanger body, in flow communication with said second bypass valve;

a second set of cooling channels, included in the heat exchanger body, in flow communication with said second bypass valve, wherein said second bypass valve is configured to facilitate a flow of a second fluid through at least a portion of said heat exchanger body during the first mode of operation; and coupling the heat exchanger assembly to the fan casing;

wherein the first set of cooling channels and the second set of cooling channels extend across a majority of an entire circumferential length of the body; and wherein the first fluid and the second fluid do not mix.

11. The method according to claim 10 further comprising coupling a plurality of cooling fins to a radially exterior surface of the heat exchanger body such that the plurality of cooling fins are configured to receive a flow of air to facilitate reducing a temperature of the first and second fluids flowing through the heat exchanger body during the first mode of operation.

12. The method according to claim 11, wherein coupling the heat exchanger assembly to the fan casing further comprises coupling the heat exchanger assembly within a recess in the fan casing such that the at least one radially exterior surface of the heat exchanger is flush with a radially interior surface of the fan casing such that only the plurality of cooling fins are exposed to the flow of air.

13. The method according to claim 10, wherein said first set of cooling channels includes a first fluid circuit outlet channel in flow communication with said first bypass valve, wherein said first bypass valve is configured to channel said first fluid to said first fluid circuit outlet channel during a second mode of operation.

14. The method according to claim 10, wherein said second bypass valve is configured to prevent a flow of said second fluid through at least a portion of said heat exchanger body during a second mode of operation.

15. A gas turbine, engine assembly comprising:
a core gas turbine engine having an axis of rotation;
a fan casing substantially circumscribing said core gas turbine engine; and
a heat exchanger assembly positioned within the fan casing, said heat exchanger assembly comprising:
a heat exchanger body, wherein the entire heat exchanger body is extending circumferentially with a substantially arcuate shape on a surface of the fan casing or on a surface of a splitter of the core gas turbine engine;
a first bypass valve included in the heat exchanger body;
a first fluid circuit inlet channel, included in the heat exchanger body, in flow communication with said first bypass valve;
a first set of cooling channels, included in the heat exchanger body, in flow communication with said first bypass valve, wherein said first bypass valve is configured to channel a first fluid to said first set of cooling channels during a first mode of operation to facilitate reducing a temperature of said first fluid;
a second bypass valve, included in the heat exchanger body;
a second fluid circuit net channel, included in the heat exchanger body, in flow communication with said second bypass valve; and
a second set of cooling channels, included in the heat exchanger body, in flow communication with said second bypass valve, wherein said second bypass valve is configured to facilitate a flow of a second fluid through at least a portion of said heat exchanger body during the first mode of operation;
wherein the first set of cooling channels and the second set of cooling channels extend across a majority of an entire circumferential length of the body; and
wherein the first fluid and the second fluid do not mix.

16. The gas turbine engine assembly in accordance to claim 15, wherein said first set of cooling channels includes a first fluid circuit outlet channel in flow communication with said first bypass valve, wherein said first bypass valve is configured to channel said first fluid to said first fluid circuit outlet channel during a second mode of operation.

17. The gas turbine engine assembly in accordance to claim 16, wherein said first bypass valve is configured to channel the first fluid to said first fluid circuit outlet channel when the first fluid reaches a first pre-determined temperature at an inlet of said heat exchanger body.

18. The gas turbine engine assembly in accordance to claim 15, wherein said second bypass valve is configured to prevent a flow of said second fluid through at least a portion of said heat exchanger body during a second mode of operation.

* * * * *